(12) United States Patent
Sutardja

(10) Patent No.: US 8,576,678 B1
(45) Date of Patent: Nov. 5, 2013

(54) SYSTEM AND METHOD FOR TRACKING POSITION OF A LASER BEAM ON A STORAGE DEVICE

(71) Applicant: Pantas Sutardja, Los Gatos, CA (US)

(72) Inventor: Pantas Sutardja, Los Gatos, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 13/718,496

(22) Filed: Dec. 18, 2012

Related U.S. Application Data

(63) Continuation of application No. 13/290,685, filed on Nov. 7, 2011, now Pat. No. 8,335,138, which is a continuation of application No. 11/710,759, filed on Feb. 26, 2007, now Pat. No. 8,054,715.

(60) Provisional application No. 60/784,004, filed on Mar. 20, 2006.

(51) Int. Cl.
  *G11B 7/00* (2006.01)

(52) U.S. Cl.
  USPC .................................. 369/44.28; 369/53.2

(58) Field of Classification Search
  None
  See application file for complete search history.

(56) References Cited

U.S. PATENT DOCUMENTS

| | | |
|---|---|---|
| 5,014,256 A | 5/1991 | Horie et al. |
| 5,768,226 A | 6/1998 | Ogino |
| 5,909,416 A | 6/1999 | Matsui |
| 6,064,638 A | 5/2000 | Graba |
| 6,349,078 B1 | 2/2002 | Hsu et al. |
| 6,407,968 B1 | 6/2002 | Nakata et al. |
| 6,859,424 B2 | 2/2005 | Wang et al. |
| 7,088,646 B1 | 8/2006 | Inoue et al. |
| 7,480,217 B2 | 1/2009 | Seo |
| 2001/0021147 A1 | 9/2001 | Kang |
| 2006/0187776 A1 | 8/2006 | Okano et al. |

*Primary Examiner* — Paul Huber

(57) ABSTRACT

A system including a control module, error modules, and a tracking module. The control module: transitions a laser beam between positions on an storage medium; based on a tracking signal, adjusts a speed that the laser beam is transitioned; and while the laser beam is transitioned, increases the speed that the laser beam is transitioned from a first speed to a second speed. The error modules determine a track error of a current position of the laser beam and estimate a depth of a groove. The tracking module: while the speed of the laser beam is equal to the first speed, tracks the current position based on the track error and the depth of the groove; while the speed of the laser beam is equal to the second speed, tracks the current position based on the track error; and generates the tracking signal based on the current position.

20 Claims, 11 Drawing Sheets

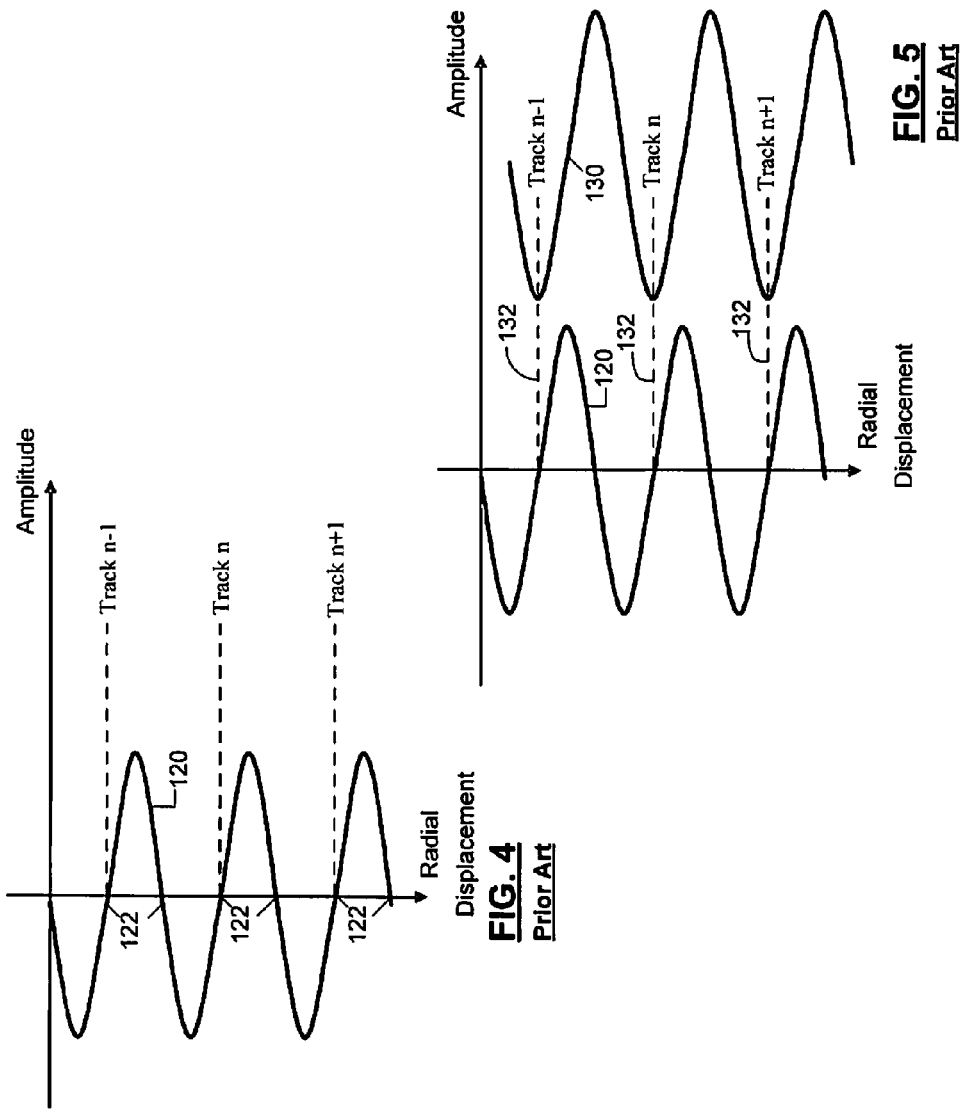

SYSTEM AND METHOD FOR TRACKING POSITION OF A LASER BEAM ON A STORAGE DEVICE

CROSS-REFERENCE TO RELATED APPLICATIONS

The present disclosure is a continuation of U.S. patent application No. 13/290,685 filed on Nov. 7, 2011 (now U.S. Pat. No. 8,335,138) which is a continuation of U.S. patent application Ser. No. 11/710,759 (now U.S. Pat. No. 8,054, 715) filed on Feb. 26, 2007, which claims the benefit of U.S. Provisional Application No. 60/784,004, filed on Mar. 20, 2006. The entire disclosures of the applications referenced above are incorporated herein by reference in their entirety.

FIELD

The present disclosure relates to optical drives and optical recording devices, and more particularly to tracking of blank recordable media.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Optical recording devices are used to record information, such as music, movies, pictures, data, etc., on recordable media. Examples of recordable media are compact discs (CDs), digital versatile/video discs (DVDs), high density/high definition DVDs and Blu-ray Discs (BDs). In order to record such information, a recording device tracks the location of a laser beam on the recordable media.

Referring to FIG. 1, a side close-up view of a recordable media 10 is shown. The recordable media 10 has lands 12 and grooves 14, which are formed on a recording layer 16 of a main substrate 18. The main substrate 18 may be adhered via an adhesive layer 20 to a dummy substrate 22, as shown. The lands 12 and grooves 14 refer to physical structures of the recording layer 16, which are adjacent each other, but have different associated depth. The grooves 14 have a larger associated depth than the lands 12. A sample land depth $D_1$ and a sample groove depth $D_2$ are shown. The depths are measured relative to and from a disk outer or entrance surface 24 and are equal to some fraction of optical wavelength of the laser beam.

The purpose of land/groove structures is to provide servo information for positioning of a laser beam spot on a disc. The land/groove structures provide reflected beam signal modulation that is detected for tracking purposes. The lands and grooves are also often created with a small amount of waviness at a pre-determined characteristic frequency, referred to as "wobble". This allows clock frequency extraction during a recording process.

Standards, such as DVD+/-R and DVD+/-RW, require recording only over grooves. An alternative standard, referred to as DVD-RAM, requires recording over both land and groove structures. In DVD+/-R and DVD+/-RW recording, the grooves and lands typically form a continuous spiral. In DVD-RAM recording, the land structures alternate with the groove structures to form a continuous spiral.

Referring to FIG. 2, a sample optical DVD drive system 50 is shown and includes a laser source 52, such as a laser diode, that provides a laser beam 54. The laser source 52 may be part of an optical read/write assembly (ORW) 56, sometimes referred to as an optical pick-up assembly. The ORW 56 includes a collimator lens 58, a polarizing beam splitter 60, a quarter wave plate 62, and an objective lens 64. The laser beam 54 is collimated by the collimator lens 58 and passed through the polarizing beam splitter 60. The laser beam 54 is received by the quarter wave plate 62 from the beam splitter 60 and is focused via the objective lens 64. The laser beam 54 may be radially displaced across tracks of the optical medium 68 through movement of the ORW 56 via a sled motor 66. The laser beam 54 is moved while the optical medium 68 is rotated about a spindle axis 69. The laser beam 54 is shaped and focused to form a spot over the land/groove structures of an optical storage medium 68 via lens actuators 70.

The light from the laser beam 54 is reflected off of the optical medium 68 and directed back into the ORW 56. The reflected light, represented by dashed line 72, is redirected by the beam splitter 60 and focused into a spot over a photodetector integrated circuit (PDIC) 74 by an astigmatic focus lens 76. Although not shown, additional photo-detectors may be incorporated and used to detect other diffracted light beams not shown.

Referring now also to FIG. 3, a quad PDIC 100 is shown. The PDIC 100 has an array of photo-detector sensors A-D that receive a focused reflected laser beam, such as the reflected beam 72. The intensity of the reflected and focused laser beam spot on the PDIC 100 is not uniform. The distribution of that intensity depends on the position of the beam spot on a recordable medium relative to the land/groove structures. The lack of uniformity results in tracking error.

The tracking error is based on photo-detector output signals $P_A$, $P_B$, $P_C$ and $P_D$ of photo sensor elements A-D of the quad PDIC 100. The tracking error (TE) or TE signal is provided by equation 1.

$$TE = (P_a + P_d) - (P_b + P_c) \qquad (1)$$

The TE signal is zero when the beam spot is fully over a groove, which is referred to as 100% on-track. The TE signal is also zero when the laser beam spot is half-way between tracks, which is referred to as 100% off-track.

Referring now also to FIG. 4, a curve 120 of TE signal variation as a function of beam spot position on a recordable medium is shown. The TE curve 120 represents TE signal amplitude versus radial direction positioning of a laser beam. The TE curve 120 is sinusoidal and has multiple zero-crossings 122, which represent different tracks. To maintain the beam spot on a track, the associated optical drive needs to lock onto the zero-crossing of a slope of the TE curve 120. In other words, the optical drive needs to detect the slope of the TE curve 120 when the TE signal is zero. However, additional information is needed when moving between tracks, especially when moving across several tracks. This is accomplished by monitoring the number of instances when the TE signal is equal to zero while radially moving the laser beam.

Misalignment can occur between the center of the recordable medium and the spindle axis of rotation, such as the spindle axis 69. This mis-alignment can cause "radial runout". For tracking purposes, when there is no radial run-out, it is sufficient to move the laser beam in one direction and count the number of zero-crossings of the TE signal. But typically, radial run-out occurs and causes the laser beam to cross one or more tracks. The radial run-out can alternate between radially inward and radially outward directions. This can occur when radial actuators and/or the associated sled motor are not being driven. As a result, simply counting zero-crossings of the TE signal does not provide the aggregate and appropriate number of track crossings in one direction.

To account for radial run-out, a second signal 130, referred to as a quad-sum (QSUM) signal, which is in quadrature to the TE signal, is generated and monitored. Referring to FIG. 5, a relationship between the TE signal and the QSUM signal are shown. The QSUM signal is also sinusoidal and is shifted 90° in phase relative to the TE signal. The QSUM signal is generated through the sum of the photo-detector output signals $P_A$, $P_B$, $P_C$ and $P_D$ as in equation 2.

$$QSUM = P_A + P_B + P_C + P_D \quad (2)$$

When the laser beam is positioned over a land region, the QSUM signal is at a maximum amplitude (a track boundary). When the laser beam is positioned over a groove region, the QSUM signal is at a minimum amplitude. The QSUM signal provides an accurate technique for counting track crossings. A track crossing counter is incremented or decremented at the zero-crossings 122 when the QSUM signal is at a maximum amplitude. Track crossings can also be defined as the moment when the QSUM signal is at a minimum amplitude, as denoted by dashed lines 132.

Unfortunately, for recordable optical media, the depth of modulation in the QSUM signal depends greatly on the media type and whether the media is written with user data or is a blank disc. The depth of modulation refers to the amplitude difference in the QSUM signal between on-track and off-track. The depth of modulation of the QSUM signal is shallow for blank recordable media. A shallow depth can render the QSUM signal virtually ineffective for track center location determination. Thus, it is difficult to perform an accurate seek over a blank recordable media due to the lack of a high contrast QSUM signal. Optical drive performance is degraded when a seek is inappropriately performed. The improperly performed seek is often detected after track following and reading of wobble information. This later detection forces another inaccurate seek when an attempt is initiated to move a read/write head to a target track position.

SUMMARY

A system is provided and includes a control module, error modules, and a tracking module. The control module is configured to (i) transition a laser beam from a first position on an storage medium to a second position on the storage medium, (ii) based on a tracking signal, adjust a speed at which the laser beam is transitioned from the first position to the second position, and (ii) while the laser beam is transitioned from the first position to the second position, increase the speed at which the laser beam is transitioned from a first speed to a second speed. The error modules are configured to (i) determine a track error of a current position of the laser beam, and (ii) estimate a depth of a groove on the storage medium. The tracking module is configured to while the speed at which the laser beam is transitioned is equal to the first speed, track the current position of the laser beam based on (i) the track error, and (ii) the depth of the groove. The tracking module is also configured to (i) while the speed at which the laser beam is transitioned is equal to the second speed, track the current position of the laser beam based on the track error, and (ii) generate the tracking signal based on the current position.

In other features, a method is provided and includes transitioning a laser beam from a first position on a storage medium to a second position on the storage medium. A speed at which the laser beam is transitioned is adjusted from the first position to the second position based on a tracking signal. While the laser beam is transitioned from the first position to the second position, the speed at which the laser beam is transitioned is increased from a first speed to a second speed. A track error of a current position of the laser beam is determined. A depth of a groove on the storage medium is estimated. While the speed at which the laser beam is transitioned is equal to the first speed, the current position of the laser beam is tracked based on (i) the track error, and (ii) the depth of the groove. While the speed at which the laser beam is transitioned is equal to the second speed, the current position of the laser beam is tracked based on the track error. The tracking signal is generated based on the current position.

A tracking system for a drive is provided and includes a beam positioning actuator and a control module. The beam positioning actuator is configured to radially displace a laser beam relative to an optical storage medium. The control module is configured to increase a seek speed of the beam positioning actuator to a predetermined speed based on a seek command signal to move the laser beam to a target position on the optical storage medium. The control module is also configured to reduce the seek speed of the beam positioning actuator from the predetermined speed responsive to the laser beam being radially displaced within a predetermined distance of the target position on the optical storage medium.

In other features, a tracking system for an optical drive is provided and includes a focus error module. The focus error module generates a focus error signal based on a difference between a first sensor output signal and a second sensor output signal, which are based on a reflected portion of a laser beam that is reflected by an optical storage medium. A control module generates a tracking signal based on the focus error signal.

In other features, the tracking system includes an illumination device that directs the laser beam at the optical storage medium. A sensor that receives a reflected portion of the laser beam and that generates the first sensor output signal and the second sensor output signal. In other features, the illumination device includes a laser diode. In other features, the illumination device directs the laser beam at the optical storage medium, which is selected from at least one of a compact disc, a digital versatile/video disc, a high definition optical disc, a read only medium and a recordable medium. In other features, the sensor includes a photodetector.

In other features, the tracking system includes a depth estimation module that generates a depth estimation signal based on the focus error signal, where the control module generates the tracking signal based on the focus error signal and the depth estimation signal.

In other features, the depth estimation module generates the depth estimation signal based on a plant model of a focus loop. In other features, the depth estimation module generates the depth estimation signal based on a plant model of a focus loop, and where the plant model is based on a bode plot. In other features, the depth estimation module generates the depth estimation signal based on a functional representation of a focus control loop. In other features, the depth estimation module generates the depth estimation signal to indicate a depth of at least one of a land or a groove of the storage medium.

In other features, the control module generates the tracking signal further based on a track error signal.

In other features, the control module detects zero-crossings of the track error signal based on a depth estimation signal. In other features, the control module detects the zero-crossings based on a polarity of the track error signal and an amplitude of the depth estimation signal. In other features, the sensor module generates beam detection signals, and where the control module generates the track error signal based on the beam detection signals.

In other features, a drive is provided that includes the above tracking system. In other features, the drive includes a motor that adjusts a position of the laser beam. In other features, the motor adjusts a position of the laser beam at a seek speed associated with a track crossing frequency that is greater than a disc distortion disturbance frequency.

In other features, an optical drive is provided that includes the above tracking system. In other features, the optical drive includes a motor that is arranged to rotate a storage medium. The control module enables the motor and generates the tracking signal based on the focus error signal.

In other features, the optical drive includes a driver that communicates with the control module. The control module reads from or writes to the recordable medium based on the tracking signal via the driver.

In other features, the motor adjusts a position of the laser beam at a seek speed associated with a track crossing frequency that is greater than a disc distortion disturbance frequency.

In other features, a method is provided that includes operating an optical drive. A focus error signal is generated based on a difference between a first sensor output signal and a second sensor output signal. The first and second sensor output signals are based on a reflected portion of a laser beam that is reflected by an optical storage medium. The laser beam is tracked to generate a tracking signal based on the focus error signal via a control module.

In other features, the method includes directing the laser beam at the optical storage medium. A reflected portion of the laser beam is received. The first and second sensor output signals are generated.

In other features, the method includes generating a depth estimation signal based on the focus error signal. The tracking signal is generated based on the focus error signal and the depth estimation signal. In other features, the depth estimation signal is generated based on a plant model of a focus loop. In other features, the depth estimation signal is generated based on a plant model of a focus loop, and where the plant model is based on a bode plot. In other features, the depth estimation signal is generated based on a functional representation of a focus control loop. In other features, the depth estimation signal is generated to indicate a depth of at least one of a land or a groove of the storage medium.

In other features, the tracking signal is generated based on a track error signal. In other features, the method includes detecting zero-crossings of the track error signal based on a depth estimation signal.

In other features, the method includes detecting the zero-crossings based on a polarity of the track error signal and an amplitude of the depth estimation signal. In other features, the method includes generating beam detection signals, where the track error signal is generated based on the beam detection signals.

In other features, the method includes adjusting a position of the laser beam. In other features, the method includes adjusting a position of the laser beam at a seek speed associated with a track crossing frequency that is greater than a disc distortion disturbance frequency.

In other features, the method includes enabling a motor and generating the tracking signal based on the focus error signal.

In other features, the method includes reading from or writing to the recordable medium based on the tracking signal.

In other features, the method includes adjusting a position of the laser beam at a seek speed associated with a track crossing frequency that is greater than a disc distortion disturbance frequency.

In other features, a tracking system for an optical drive is provided and includes focus error means for generating a focus error signal. The focus error signal is based on a difference between a first and second sensor output signals, which are based on a reflected portion of a laser beam that is reflected by an optical storage medium. Control means for generating a tracking signal based on the focus error signal is included.

In other features, the tracking system includes illumination means for directing the laser beam at the optical storage medium. Sensing means for receiving a reflected portion of the laser beam and for generating the first and second sensor output signals is included. In other features, the illumination means includes a laser diode. In other features, the illumination means directs the laser beam at the optical storage medium, which is selected from at least one of a compact disc, a digital versatile/video disc, a high definition optical disc, a read only medium and a recordable medium. In other features, the sensing means includes a photodetector.

In other features, the tracking system includes depth estimation means for generating a depth estimation signal based on the focus error signal. The control means generates the tracking signal based on the focus error signal and the depth estimation signal. In other features, the depth estimation means generates the depth estimation signal based on a plant model of a focus loop. In other features, the depth estimation means generates the depth estimation signal based on a plant model of a focus loop, and where the plant model is based on a bode plot. In other features, the depth estimation means generates the depth estimation signal based on a functional representation of a focus control loop. In other features, the depth estimation means generates the depth estimation signal to indicate a depth of at least one of a land or a groove of the storage medium.

In other features, the control means generates the tracking signal based on a track error signal. In other features, the control means detects zero-crossings of the track error signal based on a depth estimation signal. In other features, the control means detects the zero-crossings based on a polarity of the track error signal and an amplitude of the depth estimation signal. In other features, the sensing means generates beam detection signals, and where the control means generates the track error signal based on the beam detection signals.

In other features, a drive is provided and includes the tracking system. In other features, the drive includes motor means for adjusting a position of the laser beam. In other features, the motor means adjusts position of the laser beam at a seek speed associated with a track crossing frequency that is greater than a disc distortion disturbance frequency.

In other features, an optical drive is provided and includes one of the above-stated tracking systems. In other features, the optical drive includes motor means for rotating a storage medium. The control means enables the motor means and generates the tracking signal based on the focus error signal.

In other features, the optical drive includes driver means for communicating with the control means. The control means reads from or writes to the recordable medium based on the tracking signal via the driver. In other features, the motor means adjusts a position of the laser beam at a seek speed associated with a track crossing frequency that is greater than a disc distortion disturbance frequency.

In other features, a tracking system for a drive is provided and includes a depth estimation module that generates a depth estimation signal indicative of land or groove depth of an optical storage medium. The depth estimation signal is based on a sensor output signal and an error signal, which are based on a reflected portion of a laser beam. The laser beam is reflected by the optical storage medium. A control module generates a tracking signal based on the depth estimation signal.

In other features, the tracking system includes an illumination device that directs the laser beam at the optical storage medium. A sensor receives a reflected portion of the laser beam and generates the sensor output signal. A focus error module generates a focus error signal based on the sensor output signal. In other features, the illumination device includes a laser diode.

In other features, the illumination device directs the laser beam at the optical storage medium, which is selected from at least one of a compact disc, a digital versatile/video disc, a high definition optical disc, a read only medium and a recordable medium. In other features, the sensor includes a photodetector.

In other features, the tracking system includes a focus error module that generates a focus error signal, where the control module generates the tracking signal based on the focus error signal and the depth estimation signal. In other features, the focus error module generates the focus error signal based on a difference between a first sensor output signal and a second sensor output signal, which are based on the reflected portion.

In other features, the depth estimation module generates the depth estimation signal based on a plant model of a focus loop. In other features, the plant model is based on a bode plot. In other features, the depth estimation module generates the depth estimation signal based on a functional representation of a focus control loop.

In other features, the control module generates the tracking signal further based on a tracking error signal. In other features, the control module detects zero-crossings of the tracking error signal based on a depth estimation signal. In other features, the control module detects the zero-crossings based on polarity of the track error signal and amplitude of the depth estimation signal.

In other features, the sensor module generates beam detection signals. The control module generates the track error signal based on the beam detection signals. In other features, a drive is provided that includes one of the above tracking systems. In other features, the drive includes a motor that adjusts a position of the laser beam. In other features, the motor adjusts a position of the laser beam at a seek speed associated with a track crossing frequency that is greater than a disc distortion disturbance frequency.

In other features, a method of operating an optical drive is provided and includes generating a depth estimation signal indicative of land or groove depth of an optical storage medium. The depth estimation signal is based on a sensor output signal and an error signal, which are based on a reflected portion of a laser beam. The laser beam is reflected by the optical storage medium. The laser beam is tracked to generate a tracking signal based on the depth estimation signal via a control module.

In other features, the method includes directing the laser beam at the optical storage medium. A reflected portion of the laser beam is received and the sensor output signal is generated. A focus error signal is generated based on the sensor output signal.

In other features, the method includes generating a focus error signal, where the tracking signal is generated based on the focus error signal and the depth estimation signal. In other features, the focus error signal is generated based on a difference between a first sensor output signal and a second sensor output signal, which are based on the reflected portion.

In other features, the depth estimation signal is generated based on a plant model of a focus loop. In other features, the plant model is based on a bode plot. In other features, the depth estimation signal is generated based on a functional representation of a focus control loop.

In other features, the tracking signal is generated based on a tracking error signal.

In other features, the method includes detecting zero-crossings of the tracking error signal based on a depth estimation signal.

In other features, the zero-crossings are detected based on polarity of the track error signal and amplitude of the depth estimation signal.

In other features, the method includes generating beam detection signals, and where the track error signal is generated based on the beam detection signals.

In other features, the method includes adjusting a position of the laser beam.

In other features, the method includes adjusting a position of the laser beam at a seek speed associated with a track crossing frequency that is greater than a disc distortion disturbance frequency.

In other features, a tracking system for a drive is provided and includes depth estimation means for generating a depth estimation signal indicative of land or groove depth of an optical storage medium. The depth estimation signal is based on a sensor output signal and an error signal, which are based on a reflected portion of a laser beam. The laser beam is reflected by the optical storage medium. Control means for generating a tracking signal based on the depth estimation signal is included.

In other features, the tracking system includes illumination means for directing the laser beam at the optical storage medium. Sensing means for receiving a reflected portion of the laser beam is included. The sensing means generates the sensor output signal. Focus error means for generating a focus error signal based on the sensor output signal is also included. In other features, the illumination means includes a laser diode.

In other features, the illumination means directs the laser beam at the optical storage medium, which is selected from at least one of a compact disc, a digital versatile/video disc, a high definition optical disc, a read only medium and a recordable medium.

In other features, the sensing means includes a photodetector.

In other features, the tracking system includes focus error means for generating a focus error signal. The control means generates the tracking signal based on the focus error signal and the depth estimation signal.

In other features, the focus error means generates the focus error signal based on a difference between a first and second sensor output signals, which are based on the reflected portion.

In other features, the depth estimation means generates the depth estimation signal based on a plant model of a focus loop. In other features, the plant model is based on a bode plot. In other features, the depth estimation means generates the depth estimation signal based on a functional representation of a focus control loop.

In other features, the control means generates the tracking signal further based on a tracking error signal. In other features, the control means detects zero-crossings of the tracking error signal based on a depth estimation signal. In other features, the control means detects the zero-crossings based on polarity of the track error signal and amplitude of the depth estimation signal.

In other features, the sensing means generates beam detection signals, and where the control means generates the track error signal based on the beam detection signals.

In other features, a drive is provided and includes one of the above tracking systems. In other features, the drive includes motor means for adjusting a position of the laser beam. In other features, the motor means adjusts a position of the laser beam at a seek speed associated with a track crossing frequency that is greater than a disc distortion disturbance frequency.

In other features, a tracking system is provided and includes a focus loop that adjusts focus of a laser beam and that generates a focus error signal based on a reflected portion of the laser beam that is reflected by an optical storage medium. A generator generates a track error signal. A depth module, that generates a depth estimation signal that is indicative of a land or groove depth of the optical storage medium and based on the focus error signal. A zero-crossing detector detects a zero-crossing of the track error signal based on the depth estimation signal.

In other features, the tracking system includes an illumination device that directs the laser beam at the optical storage medium. A sensor receives the reflected portion of the laser beam and generates a sensor output signal. The focus loop generates the focus error signal based on the sensor output signal.

In other features, the illumination device directs the laser beam at the optical storage medium, which is selected from at least one of a compact disc, a digital versatile/video disc, a read only medium, a recordable medium and an optical storage medium.

In other features, the focus loop generates the focus error signal based on a difference between a first and second sensor output signal, which are based on the reflected portion.

In other features, the zero-crossing detector corrects zero-crossings based on a polarity of the track error signal and an amplitude of the depth estimation signal.

In other features, the depth module generates the depth estimation signal based on a plant model of the focus loop. In other features, the plant model is based on a bode plot.

In other features, the tracking system includes a track counter that counts track crossings based on a software algorithm when a seek speed is less than a predetermined speed. In other features, the track counter counts track crossings based on the track error signal and the depth estimation signal. In other features, the track counter counts track crossings based on a software algorithm when a seek speed is within a predetermined range. In other features, the track counter counts track crossings based on a hardware based algorithm when a seek speed is greater than a predetermined maximum speed. In other features, the track counter counts track crossings based on the focus error signal and the track error signal.

In other features, an optical drive is provided and includes one of the above tracking systems. In other features, the optical drive includes a motor that adjusts position of the laser beam. In other features, the motor adjusts position of the laser beam at a seek speed associated with a track crossing frequency that is greater than a disc distortion disturbance frequency.

In other features, a method of operating an optical drive includes adjusting focus of a laser beam via a focus loop. A focus error signal is generated based on a reflected portion of the laser beam that is reflected by an optical storage medium. A track error signal is generated. A land or groove depth of the optical storage medium is indicated and a depth estimation signal is generated based on the focus error signal. A zero-crossing of the track error signal is detected based on the depth estimation signal.

In other features, the method includes directing the laser beam at the optical storage medium. The reflected portion of the laser beam is received and a sensor output signal is generated. The focus error signal is generated based on the sensor output signal via a focus loop.

In other features, the focus error signal is generated based on a difference between a first and second sensor output signals, which are based on the reflected portion.

In other features, the zero-crossings are corrected based on a polarity of the track error signal and an amplitude of the depth estimation signal.

In other features, the depth estimation signal is generated based on a plant model of the focus loop. In other features, the plant model is based on a bode plot.

In other features, the method includes counting track crossings based on a software algorithm when a seek speed is less than a predetermined speed. A tracking signal is generated based on the track crossings and the zero crossing. In other features, the track crossings are counted based on the track error signal and the depth estimation signal.

In other features, the method includes counting track crossings based on a software algorithm when a seek speed is within a predetermined range. A tracking signal is generated based on the track crossings and the zero crossing.

In other features, the method includes counting track crossings based on a hardware based algorithm when a seek speed is greater than a predetermined maximum speed. A tracking signal based on the track crossings and the zero crossing. In other features, the track crossings are counted based on the focus error signal and the track error signal. In other features, the method includes adjusting position of the laser beam.

In other features, the method includes adjusting position of the laser beam at a seek speed associated with a track crossing frequency that is greater than a disc distortion disturbance frequency.

In other features, a tracking system is provided and includes focus loop means for adjusting focus of a laser beam and for generating a focus error signal based on a reflected portion of the laser beam that is reflected by an optical storage medium. Generator means for generating a track error signal is included. Depth means for generating a depth estimation signal that is indicative of a land or groove depth of the optical storage medium and is based on the focus error signal is included. Zero-crossing means for detecting a zero-crossing of the track error signal based on the depth estimation signal is also included.

In other features, the tracking system includes illumination means for directing the laser beam at the optical storage medium. Sensor means for receiving the reflected portion of the laser beam and for generating a sensor output signal is included. The focus loop generates the focus error signal based on the sensor output signal.

In other features, the illumination means directs the laser beam at the optical storage medium, which is selected from at least one of a compact disc, a digital versatile/video disc, a read only medium, a recordable medium and an optical storage medium.

In other features, the focus loop means generates the focus error signal based on a difference between a first and second sensor output signals, which are based on the reflected portion.

In other features, the zero-crossing means corrects zero-crossings based on a polarity of the track error signal and an amplitude of the depth estimation signal.

In other features, the depth means generates the depth estimation signal based on a plant model of the focus loop. In other features, the plant model is based on a bode plot.

In other features, the tracking system includes tracking means for counting track crossings based on a software algorithm when a seek speed is less than a predetermined speed. In other features, the tracking means counts track crossings based on the track error signal and the depth estimation signal.

In other features, the tracking system includes tracking means for counting track crossings based on a software algorithm when a seek speed is within a predetermined range.

In other features, the tracking system includes tracking means for counting track crossings based on a hardware based algorithm when a seek speed is greater than a predetermined maximum speed. In other features, the tracking means counts track crossings based on the focus error signal and the track error signal.

In other features, an optical drive is provided and includes one of the above tracking systems. In other features, the optical drive includes motor means for adjusting position of the laser beam.

In other features, the motor means adjusts position of the laser beam at a seek speed associated with a track crossing frequency that is greater than a disc distortion disturbance frequency.

In other features, a tracking system for a drive is provided and includes. A beam positioning actuator that radially displaces a laser beam relative to an optical storage medium. A control module that increases a seek speed of the laser beam positioning actuator to a predetermined speed based on a seek command signal. The control module reduces the seek speed to a target speed when the laser beam is within a predetermined distance of a target position.

In other features, the tracking system includes an illumination device that generates the laser beam. In other features, the illumination device directs the laser beam at the optical storage medium, which is selected from at least one of a compact disc, a digital versatile/video disc, a high definition disc, a read only medium, a recordable medium and an optical storage medium.

In other features, the control module activates a tracking loop to lock onto a target track when the target position is reached.

In other features, the tracking system includes a track counter that counts track crossings of the laser beam. In other features, the track counter counts track crossings during an increase of the seek speed. In other features, the track counter counts track crossings based on a focus error signal. In other features, the track counter counts track crossings based on a track error signal. In other features, the track counter counts track crossings when the seek speed is less than the predetermined speed. In other features, the track counter counts track crossings based on a depth estimation signal and a track error signal. In other features, the track counter counts track crossings when the seek speed is within a predetermined range.

In other features, the tracking system includes a sensor module that receives at least a reflected portion of the laser beam and generates a sensor output signal. A focus module generates a focus error signal based on the sensor output signal. The control module adjusts the seek speed based on the focus error signal.

In other features, the tracking system includes a depth module that generates a depth estimation signal based on the focus error signal and a plant model of a focus control loop.

In other features, the control module enables a hardware-based track counter when a track crossing frequency exceeds the predetermined speed.

In other features, the control module disables the hardware-based track counter and enables a software-based track counter when the track crossing frequency is below the predetermined speed.

In other features, an optical drive is provided and includes one of the above tracking systems. In other features, the optical drive includes a motor arranged to rotate the optical storage medium, the control module enables the motor.

In other features, the optical drive includes a driver that communicates with an illumination device. The control module communicates with the driver and reads from or writes to the optical storage medium when the tracking loop is locked onto a target track associated with the target position via the illumination device.

In other features, a method of operating an optical drive is provided and includes radially displacing a laser beam relative to an optical storage medium. A seek speed of a laser beam positioning actuator is increased to a predetermined speed based on a seek command signal. The seek speed is reduced to a target speed when the laser beam is within a predetermined distance of a target position. In other features, the method includes generating the laser beam.

In other features, the method includes activating a tracking loop to lock onto a target track when the target position is reached.

In other features, the method includes counting track crossings of the laser beam. In other features, the method includes counting track crossings during an increase of the seek speed. In other features, the method includes counting track crossings based on a focus error signal. In other features, the method includes counting track crossings based on a track error signal. In other features, the method includes counting track crossings when the seek speed is less than the predetermined speed. In other features, the method includes counting track crossings based on a depth estimation signal and a track error signal. In other features, the method includes counting track crossings when the seek speed is within a predetermined range.

In other features, the method includes receiving a reflected portion of the laser beam and generating a sensor output signal. A focus error signal is generated based on the sensor output signal. The seek speed is adjusted based on the focus error signal.

In other features, the method includes generating a depth estimation signal based on the focus error signal and a plant model of a focus control loop.

In other features, the method includes enabling a hardware-based track counter when a track crossing frequency exceeds the predetermined speed.

In other features, the method includes disabling the hardware-based track counter and enabling a software-based track counter when the track crossing frequency is below the predetermined speed.

In other features, the method includes reading from or writing to the optical storage medium when the tracking loop is locked onto a target track associated with the target position.

In other features, a tracking system for a drive is provided and includes beam positioning means for radially displaces a laser beam relative to an optical storage medium. Control means for increasing a seek speed of the beam positioning means to a predetermined speed based on a seek command signal is included. The control means reduces the seek speed to a target speed when the laser beam is within a predetermined distance of a target position.

In other features, the tracking system includes illumination means for generating the laser beam. In other features, the illumination means directs the laser beam at the optical storage medium, which is selected from at least one of a compact disc, a digital versatile/video disc, a high definition disc, a read only medium, a recordable medium and an optical storage medium.

In other features, the control means activates a tracking loop to lock onto a target track when the target position is reached.

In other features, the tracking system includes track counting means that counts track crossings of the laser beam. In other features, the track counting means track crossings during an increase of the seek speed. In other features, the track counting means counts track crossings based on a focus error signal. In other features, the track counting means counts track crossings based on a track error signal.

In other features, the track counting means counts track crossings when the seek speed is less than the predetermined speed. In other features, the track counting means counts track crossings based on a depth estimation signal and a track error signal. In other features, the track counting means counts track crossings when the seek speed is within a predetermined range.

In other features, the tracking system includes sensor means for receiving a reflected portion of the laser beam and generating a sensor output signal. Focus means for generating a focus error signal based on the sensor output signal is included. The control means adjusts the seek speed based on the focus error signal.

In other features, the tracking system includes a depth means for generating a depth estimation signal based on the focus error signal and a plant model of a focus control loop.

In other features, the control means enables a hardware-based track counter when a track crossing frequency exceeds the predetermined speed. In other features, the control means disables the hardware-based track counter and enables a software-based track counter when the track crossing frequency is below the predetermined speed.

In other features, an optical drive is provided and includes one of the above tracking systems. In other features, the optical drive includes motor means for rotating the optical storage medium. The control module enables the motor. In other features, the optical drive includes driver means for communicating with an illumination device. The control means communicates with the driver and reads from or writes to the optical storage medium when the tracking loop is locked onto a target track associated with the target position via the illumination device.

In still other features, the systems and methods described above are implemented by a computer program executed by one or more processors. The computer program can reside on a computer readable medium such as but not limited to memory, non-volatile data storage and/or other suitable tangible storage mediums.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 4 is a track error signal graph according to the prior art;

FIG. 5 is a graph illustrating a relationship between track error signal and quadrature/quad-sum signal according to the prior art;

DETAILED DESCRIPTION

Figure 1:
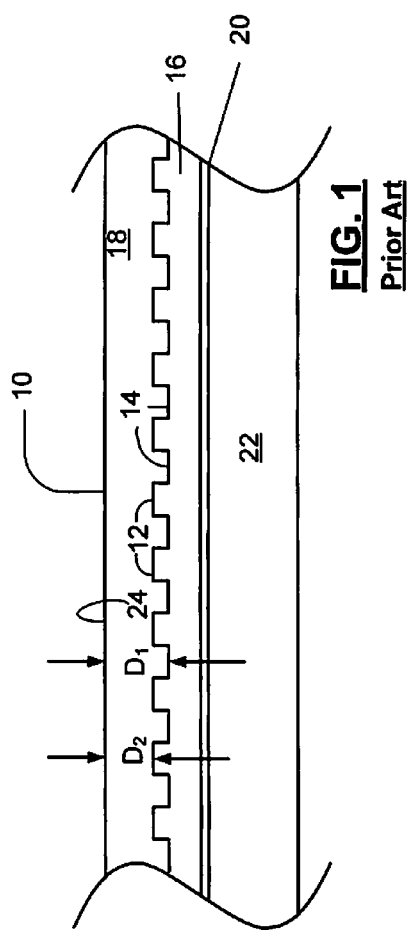
FIG. 1 is a side close-up view of a recording media according to the prior art.
Figure 2:
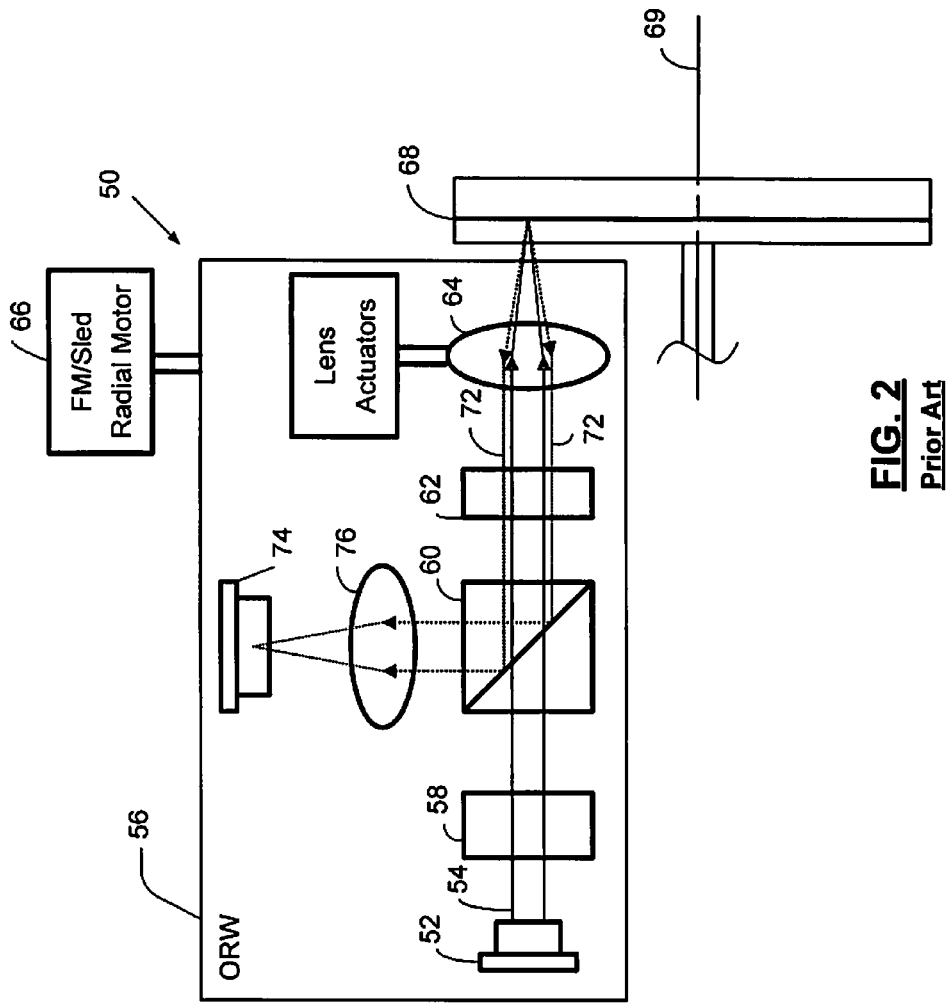
FIG. 2 is a functional block diagram of an optical drive system according to the prior art.

The following description is merely exemplary in nature and is in no way intended to limit the disclosure, its application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. A software module or module that is software based may refer to a set or series of software code, which are used to perform one or more tasks. It should be understood that steps within a method may be executed in different order without altering the principles of the present disclosure.

Figure 6:
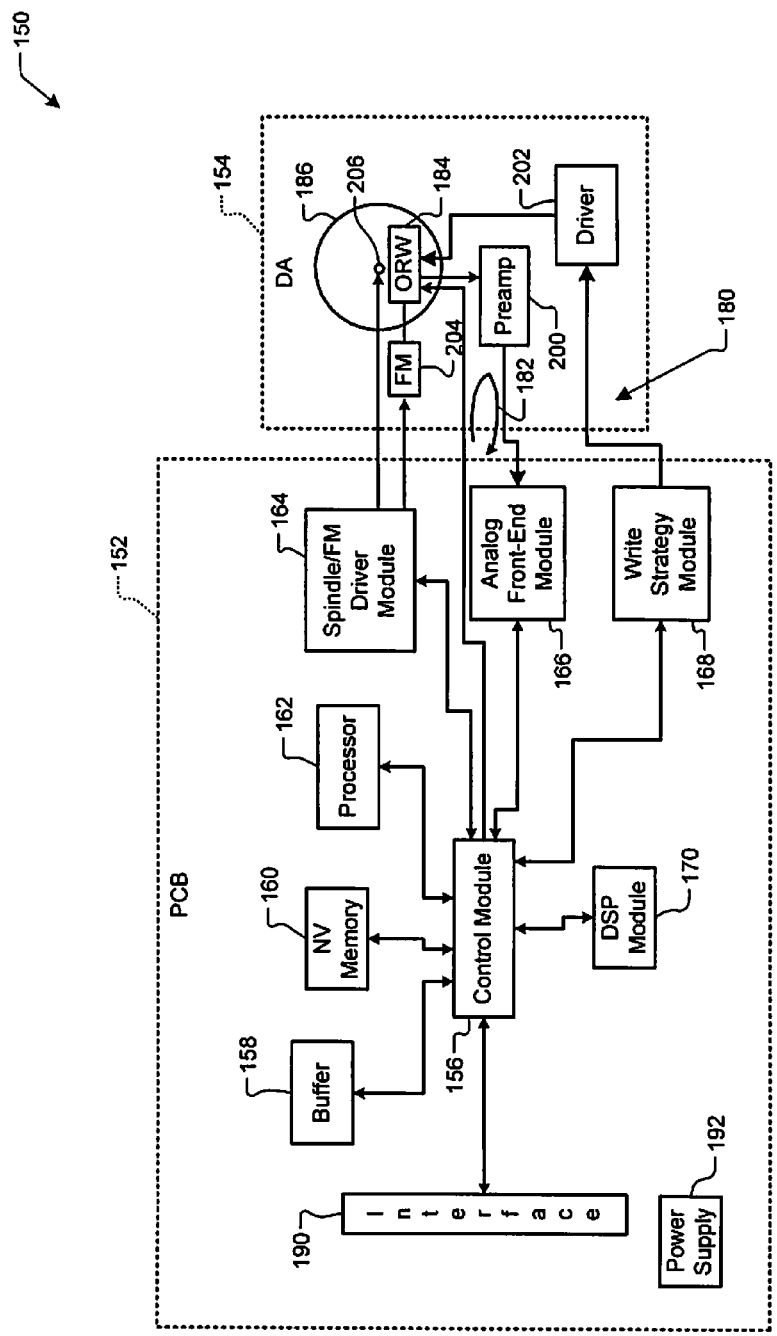
FIG. 6 is a functional block diagram of an optical drive according to an embodiment of the present disclosure.

Referring to FIG. 6, an optical drive 150 is shown. The drive 150 may be for example a digital versatile/video disc (DVD) drive, a compact disc (CD) drive or a high definition optical disc drive, such as a high definition DVD or a Blu-ray Disc (BD) drive. The drive 150 may include a printed circuit board (PCB) 152 and a disc assembly (DA) 154. The PCB 152 includes a control module 156, a buffer 158, nonvolatile memory 160, a processor 162, a spindle/FM (feed motor) driver module 164, an analog front-end module 166, a write strategy module 168, and a DSP module 170. The drive 150 includes a tracking system 180 with a focus servo/control loop 182. The focus loop 182 includes an optical device or optical read/write circuit 184 that is part of the DA 154. The focus loop 182 is used in tracking a storage medium 186. This is described in further detail below. The storage medium 186 may be for example a DVD, a CD, a read only medium, a recordable medium, an optical storage medium, and/or other known optical storage medium.

The control module 156 controls components of the DA 154 and communicates with an external device (not shown) via an I/O interface 190. The external device may include a computer, a multimedia device, a mobile computing device, etc. The I/O interface 190 may include wireline and/or wireless communication links.

The control module 156 may receive data from the buffer 158, nonvolatile memory 160, the processor 162, the spindle/FM driver module 164, the analog front-end module 166, the write strategy module 168, the DSP module 170, and/or the I/O interface 190. The processor 162 may process the data, including encoding, decoding, filtering, and/or formatting. The DSP module 170 performs signal processing, such as video and/or audio coding/decoding.

The processed data may be output to the buffer 158, nonvolatile memory 160, the processor 162, the spindle/FM driver module 164, the analog front-end module 166, the write strategy module 168, the DSP module 170, and/or the I/O interface 190.

The control module 156 may use the buffer 158 and/or nonvolatile memory 160 to store data related to the control and operation of the drive 150. The buffer 158 may include DRAM, SDRAM, etc. The nonvolatile memory 160 may include flash memory (including NAND and NOR flash memory), phase change memory, magnetic RAM, or multi-state memory, in which each memory cell has more than two states. The PCB 152 includes a power supply 192 that provides power to the components of the drive 150.

The DA 154, in addition to the focus loop 182, may include a preamplifier device 200, an illumination device driver 202 and a feed motor (FM)/sled radial motor 204. The illumination driver 202 may be, for example, a laser driver. A spindle motor 206 rotates the storage medium 186. The feed motor 204 actuates the ORW 184, or a portion thereof, relative to the storage medium 186.

When reading data from the storage medium 186, the laser driver 202 provides read power to the ORW 184. The ORW 184 detects data from the storage medium 186, and transmits the data to the preamplifier device 200. The analog front-end module 166 receives data from the preamplifier device 200 and performs such functions as filtering and A/D conversion. To write to the storage medium 186, the write strategy module 168 transmits power level and timing information to the illumination driver 202. The illumination driver 202 controls the ORW 184 to write data to the storage medium 186.

Figure 7:
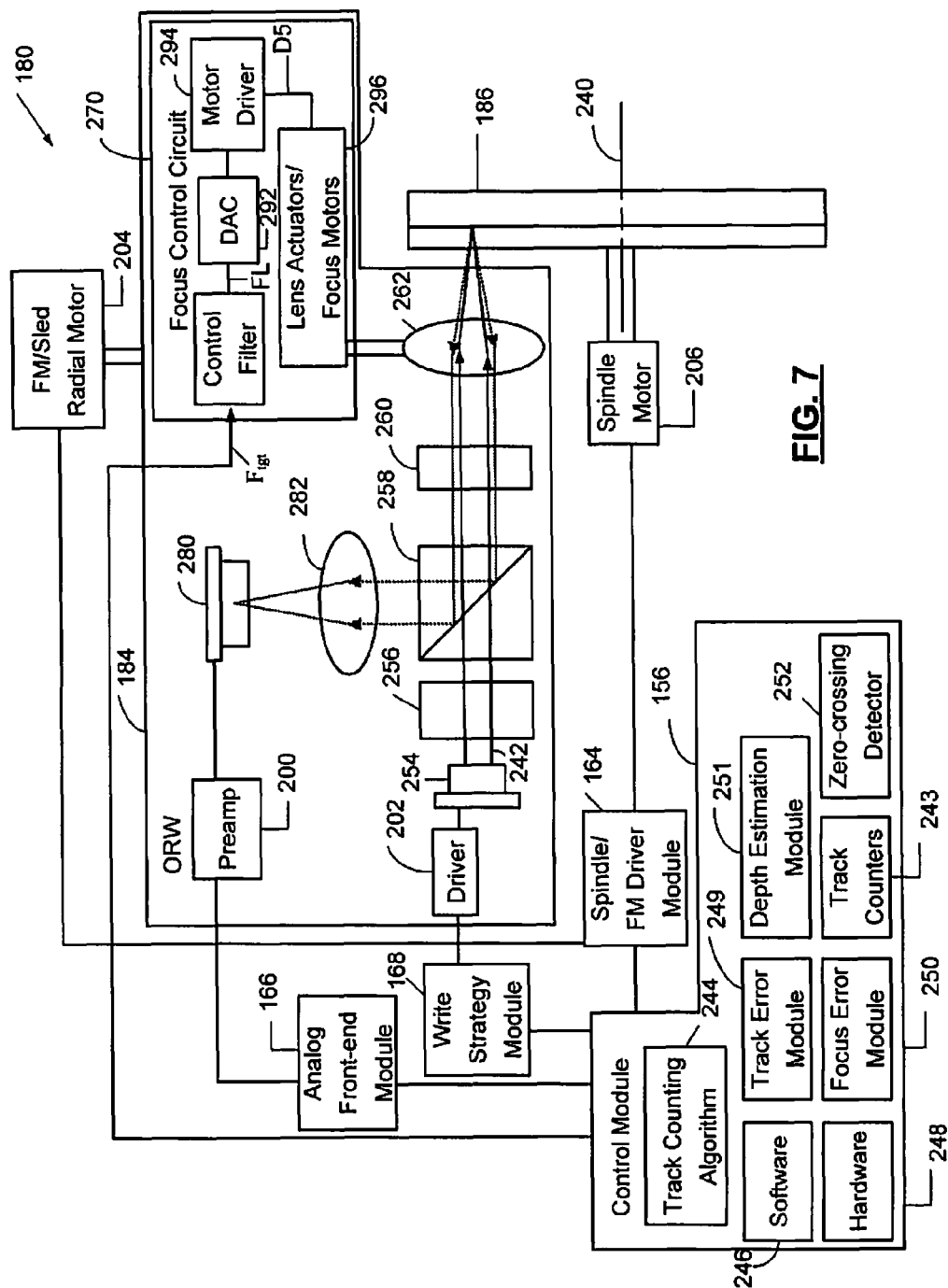
FIG. 7 is a functional block diagram of a tracking system portion of the optical drive of FIG. 6.

Referring now to FIG. 7, a functional block diagram of a tracking system portion 180 of the drive 150 is shown. The tracking system 180 includes the control module 156 and the ORW 184, which is arranged in relation to the storage medium 186. As shown, the storage medium 186 rotates about a spindle axis 240 via the spindle motor 206. The control module 156 in conjunction with the ORW 184 generates, directs and tracks the position of a beam 242 on the storage medium 186.

The control module 156 includes one or more track counters 243, track counting algorithms 244, track counting software/firmware 246, and track counting hardware 248. The track counters 243 may be software/firmware or hardware based and be separate from, part of, or include the algorithms 244, software 246 and/or the hardware 248. The track counting algorithms 244 may be part of, separate from, and/or used by the software 246 and the hardware 248. The track counting algorithms 244 may be stored in the memory 160. The control module 156 may also include a track error module 249, a focus error module 250, a depth estimation module 251 and a zero-crossing detector 252. The modules 249-252 may be part of the control module 156, as shown, may be stored in the memory 160 or may be separate, stand alone software and/or hardware based modules. The modules 249-252 may be part of the algorithms 244, the software 246 and the hardware 248. The modules are described with respect to the embodiments of FIG. 10.

The ORW 184 includes an illumination device 254, such as a laser source or diode, which provides the beam 242. The ORW 184 also includes a collimator lens 256, a polarizing beam splitter 258, a quarter wave plate 260, and an objective lens 262 and/or other beam forming, filtering and directing devices. The beam 242 is collimated by the collimator lens 256 and passed through the polarizing beam splitter 258. The beam 242 is received by the quarter wave plate 260 from the beam splitter 258 and is focused via the objective lens 262. The beam 242 may be radially displaced across tracks of the storage medium 186. This displacement may be performed through movement of the objective lens 262, via a focus control circuit 270, and/or through movement of the ORW 184, via the FM/sled motor 204. The beam 242 is shaped and focused to form a spot over land/groove structures of the storage medium 186 via a focus control circuit 270. The land/groove structures are on a recording layer of the storage medium 186. A sample of land and groove structures is shown in FIG. 1.

Figure 3:
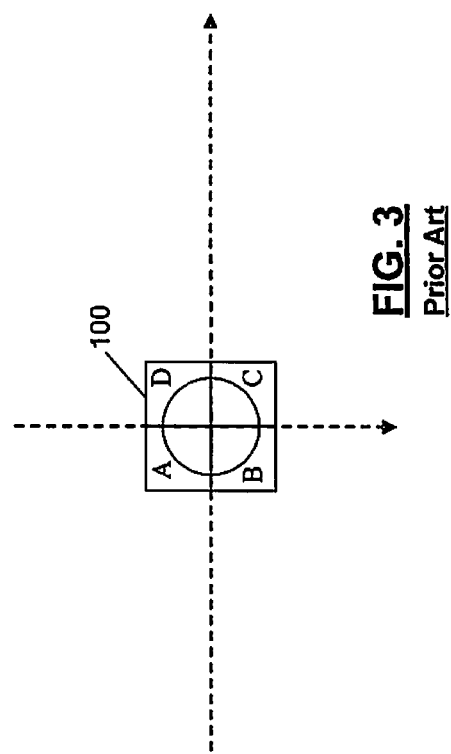
FIG. 3 is a quad photo-detector integrated circuit according to the prior art.

The light from the beam 242 is reflected off of the storage medium 186 and directed back into the ORW 184. The reflected light, represented by the dashed lines 272 is redirected by the beam splitter 258 and focused into a spot over a sensor 280 by an astigmatic focus lens 282. The sensor 280 may be in the form of a photo-detector integrated circuit (PDIC), such as that shown in FIG. 3 or may be some other light detection device known in the art. The sensor may include any number of light sensitive elements. Additional photo-detectors may be incorporated and used to detect other diffracted light beams not shown.

The focus control circuit 270 includes a control filter 290, which receives a focus loop control signal $F_{tgt}$ from the control module 156. The control filter 290 generates a filtered loop control signal FL that is converted to an analog signal by a digital-to-analog converter (DAC) 292. In response to the filtered control signal FL, a motor driver 294 generates the appropriate drive signal DS to operate lens actuators/focus motors 296. The focus motors are connected to the objective lens 262. Operation of the focus motors 296 adjusts orientation, position and thus associated focus of the objective lens 262.

Figure 8:
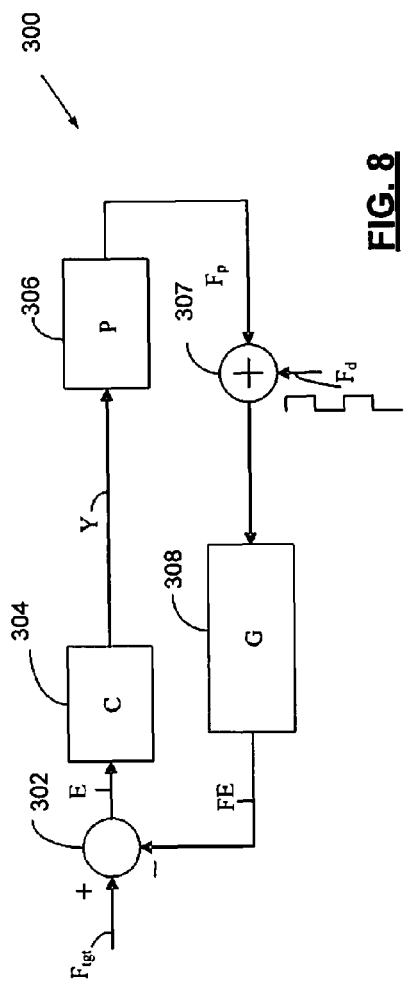
FIG. 8 is a block diagram of a focus servo/control loop representation of an optical drive.

Referring now also to FIG. 8, a focus servo/control loop representation 300 of an optical drive is shown. The focus loop 300 includes a first summer 302, a control filter 304, a focus control circuit 306, a second summer 307 and a photosensor and focus error (FE) generator 308, which are coupled in series. The control filter 304 has a filter transfer function C. The focus control circuit 306 may be similar to the focus control circuit 270 and has a control circuit transfer function P. The FE generator 308 has a generator transfer function G. The second summer 307 and the FE generator 308 are in a feedback arrangement relative to the control filter 304 and the focus control circuit 306.

In operation, the focus loop 300 receives a focus control signal $F_{tgt}$. A focus error signal FE is subtracted from the focus control signal $F_{tgt}$ to generate an error signal E via a first summer 302. The error signal E is received by the control filter 304. The control filter 304 generates a filtered output signal Y. The filtered output signal Y is received by the focus control circuit 306, which adjusts position of an objective lens, such as the objective lens 262 of FIG. 7.

A focus position signal $F_p$ is shown as an output of the focus control circuit 306 and represents the focus position of the objective lens. The focus position signal $F_p$ is a physical parameter that is not actually measured or generated and is, in other words, an unknown signal. The second summer 307 sums the focus position signal $F_p$ with a focus depth modulation signal $F_d$. The depth signal $F_d$ is associated with the depths of the lands and grooves of a storage medium. The depth signal $F_d$ is also not actually measured or generated, and thus is an unknown signal. The sum of the focus position signal $F_p$ and the depth signal $F_d$ is provided to the FE generator 308, which generates the focus error signal FE. The FE generator 308 receives the sensor output signals $P_a$-$P_d$, which in effect represent the sum of the focus position signal $F_p$ and the depth signal $F_d$.

In a storage medium of the type shown in FIG. 1 or the like, the lands and grooves are separated in depth from the surface of the storage medium by a fraction of associated optical wavelengths. As such, the location of the lands relative to the grooves can be detected based on the focus loop error signal FE. With respect to the embodiment of FIG. 7, since the astigmatic focus lens 282 is used over the sensor 280, the tracking system 180 is able to derive the focus error signal FE using equation 3.

$$FE = (P_a + P_C) - (P_b + P_d) \quad (3)$$

Depending on the type of astigmatic lens used, the polarity of the focus error signal FE may be reversed to enable negative feedback in an associated focus control loop as shown in equation 4.

$$FE = (P_b + P_d) - (P_a + P_C) \quad (4)$$

Although the focus error signal FE may be determined, this alone may not provide the focus position signal $F_p$, which is desired to determine the location of the lands relative to the grooves. Since it is generally impractical to add hardware to the focus control circuit 270 for direct position measurement, a position estimation technique is implemented. The focus position signal $F_p$ is indirectly determined and used to estimate the depth signal $F_d$. This estimation technique is described in further detail below.

Normally, the control signal $F_{tgt}$ is approximately equal to zero, thus in review of the focus control loop, the error signal E and the focus error signal FE are related as shown in equation 5:

$$E = 0 - FE = -FE \quad (5)$$

In addition, the focus control signal FE is also equal to the products of the error signal E, the filter transfer function C and the control circuit transfer function P, summed with the depth signal $F_d$, and further multiplied by the generator transfer function G. This is shown in equation 6.

$$FE = (E*C*P + Fd)*G \quad (6)$$

By substituting for the focus error signal FE in equation 6 with the error signal E in equation 5, equation 7 is derived.

$$-E = (E*C*P + Fd)*G \quad (7)$$

Solving for the depth signal $F_d$, from equation 7, provides equation 8 and/or equation 9.

$$F_d = [-E*(1 + C*P*G)]/G \quad (8)$$

$$F_d = -E/G - Y*P \quad (9)$$

A plant model $P_m$ of the focus control circuit 306 is used to determine the depth signal $F_d$. The plant model $P_m$ represents the process of the focus control circuit 306. The plant model is an internal model that allows the control module 156 to forecast future process behavior and respective output constraints of the focus control circuit 306. The plant model $P_m$ may be obtained using a Bode plot technique. Bode plots are in general known and used in signal processing to graph log magnitudes against log frequencies to show a transfer function or frequency response of a linear, time-invariant system, and thus are not further described herein. The plant model $P_m$ may be obtained after some measurement and may be stored in a memory, such as the memory 160 of FIG. 6.

Figure 9:
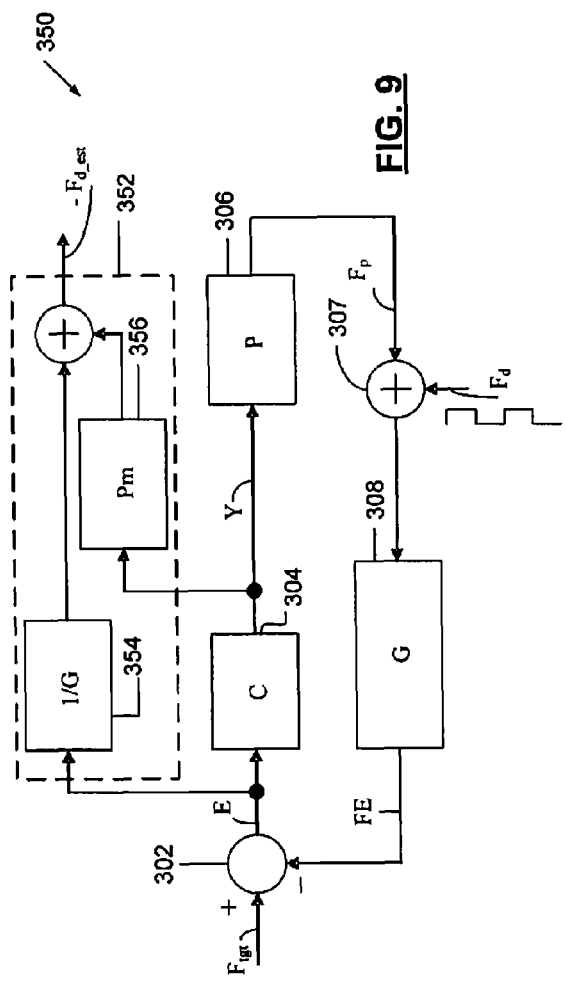
FIG. 9 is a block diagram of a focus servo/control loop representation of an optical drive incorporating a focus depth estimation circuit according to an embodiment of the present disclosure.

Referring now also to FIG. 9, a focus servo/control loop representation 350 of an optical drive incorporating a focus depth estimation circuit 352 is shown. The depth estimation circuit 352 provides a depth estimation signal $F_{d\_est}$ of the lands and grooves of a storage medium of concern. The depth estimation circuit 352 is the transfer function circuit representation of equations 8 and 9. The depth estimation signal $F_{d\_est}$, along with other generated signals, may be used to track a beam of an optical drive.

The focus loop 350 includes the control filter 304, the control circuit 306, the summers 302, 307 and the generator 308, which are coupled in a feedback arrangement similar to the focus loop 300. The depth estimation circuit 352 includes an inverted generator 354 and a plant model generator 356. The inverted generator 354 has a transfer function 1/G. The plant model generator 356 has the plant model transfer function $P_m$. The generator transfer function 1/G and the plant model transfer function $P_m$ are known to or accessible by the control module 156. The error signal E is received and multiplied by the inverted generator function 1/G and summed with the product of the filtered error signal Y and the plant model transfer function $P_m$. The result is the depth estimation signal $F_{d\_est}$.

The depth estimation signal $F_{d\_est}$ can be used to replace the quad-sum (QSUM) signal, described with respect to FIG. 5, for counting track crossings in conjunction with a track error (TE) signal. However, certain signal features in the depth estimation signal $F_{d\_est}$ can come from disc-warpage, which also causes a change in the focus position. The signal component from disc-warpage can be larger in magnitude than the depth signal change due to land/groove differences. Fortunately, focus depth change due to disc distortion is at a lower frequency than a normal tracking crossing frequency. For this reason, local peak values in the depth estimation signal $F_{d\_est}$ may be monitored for track counting purposes. The peaks may be monitored by the track counting algorithm 244.

Another technique that may be used to account for disc-warpage is to high-pass filter and remove an expected once-around, or several times around, depending on the type of warpage, signal from the depth signal $F_{d\_est}$. When this technique is used, the depth signal $F_{d\_est}$ is used when the track-crossing frequency is significantly higher than the disturbance frequency caused by disc-warpage.

Figure 10:
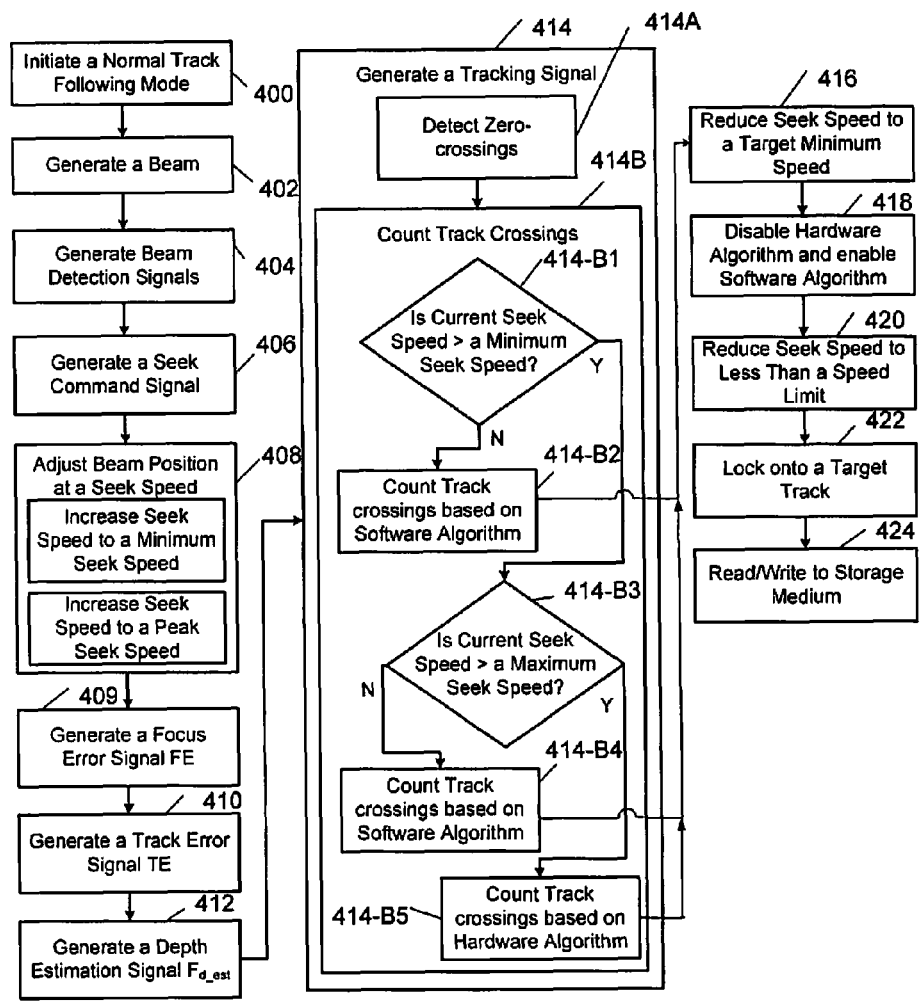
FIG. 10 is a logic flow diagram illustrating a method of operating an optical drive according multiple embodiments of the present disclosure.
Figure 11:
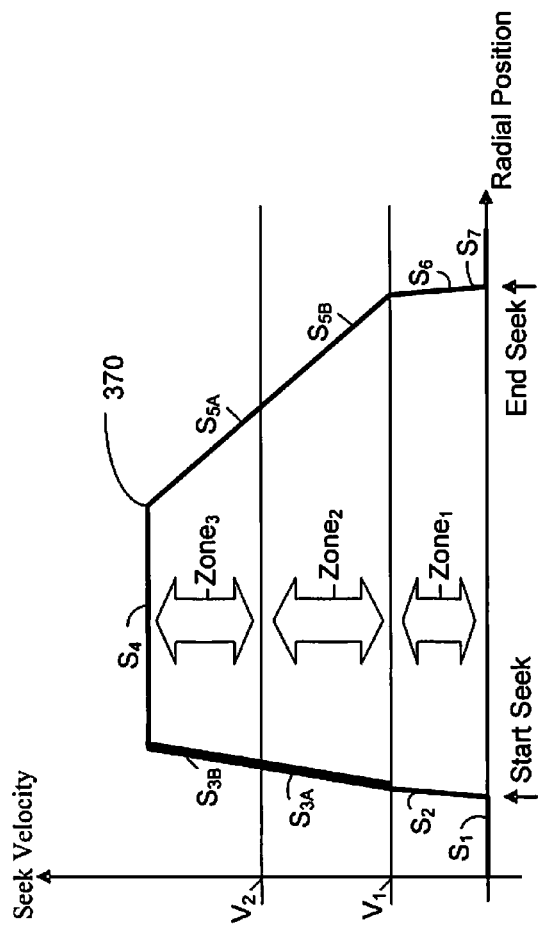
FIG. 11 is a seek velocity profile of an optical drive beam according to an embodiment of the present disclosure.

Referring now to FIGS. 10 and 11, a logic flow diagram illustrating a method of operating an optical drive and a sample seek velocity profile 370 of an optical drive beam are shown. The profile 370, as shown, has 7 segments $S_1$-$S_7$ and three seek velocity zones, namely zones$_{1-3}$. Each zone has an associated seek velocity range and time components, as well as associated tasks that are performed while operating in that zone.

In step 400, control initiates a normal track following mode. Control operates a sled motor, such as the sled motor 204, at a speed associated with normal track following. Velocity of the sled motor in normal track following mode is represented by the first segment $S_1$.

In step 402, an illumination device, such as the source 254, generates a beam that is directed at a storage medium.

In step 404, a sensor, such as the sensor 280, receives at least a reflected portion of the beam and generates sensor output signals or beam detection signals. Steps 402 and 404 may be performed continuously and/or simultaneously with any and all of the steps described herein.

In step 406, the control module generates a seek command signal that directs the sled motor to move to a selected storage medium track.

In step 408, one or more motors adjust a position of the beam at a seek speed. The seek speed is directly related to a track crossing frequency, which is greater than a disc distortion disturbance frequency. In step 408A, the control module increases a seek speed of a beam positioning actuator to a predetermined minimum speed based on the seek command signal. For robust performance, the radial seek operation is initiated upon receipt of the seek command signal using a seek speed that is greater than or equal to a pre-determined minimum seek speed. This operation may occur when a decision is made to seek to a track that is a large number of track counts away from a current track. Such operation, enables track counting to be done correctly upon initiation of the stated seek. The seek speed increase is shown and represented by the second segment $S_2$ and is associated with zone$_1$. The optical drive is minimally operated in zone$_1$. In step 408B, the seek speed may be continuously increased at varying rate up to a peak seek speed and then held approximately constant. The peak seek speed is represented by the forth segment $S_4$.

In step 409, a control module, such as the control module 156, generates a FE signal based on the sensor output signals. The focus error signal is based on focus loop beam adjustment. In step 410, a track error generator, such as the track error module 249, generates a TE signal based on sensor output signals. In step 412, a depth estimation module, such as the depth estimation module 251, generates a depth estimation signal $F_{d\_est}$ based on the FE signal. The depth estimation signal $F_{d\_est}$ may be based on a plant model of a focus loop, such as the focus loop 182.

In step 414, the control module generates a tracking signal based on the TE signal, the focus error signal and the depth estimation signal $F_{d\_est}$. The tracking signal indicates the current track of the beam. The FE signal, the TE signal, the depth estimation signal $F_{d\_est}$ and the tracking signal are generated continuously and may be generated simultaneously with any and all of the steps described herein.

In step 414A, a zero-crossing detector, such as the zero-crossing detector 252, detects zero-crossings of the TE signal based on the depth estimation signal $F_{d\_est}$. The depth estimation signal $F_{d\_est}$ provides transition information between lands and grooves of the storage medium, which may be compared with the track error signal TE. The zero-crossing detector corrects zero-crossings based on polarity of the TE signal and amplitude of the depth estimation signal $F_{d\_est}$.

In step 414B, the control module counts the track crossings during seek. The control module may use track counters, a track counting algorithm, software/firmware and/or hardware, such as the counters 243, the algorithm 244, the software 246 and/or the hardware 248, to count the track crossings. Although it may be easier or less costly to implement a plant model in software, software can be speed limited, depending upon the sampling rate of the software. Thus, hardware may be used to count track crossing when above a software maximum speed. Example embodiments are described below for software and hardware tracking.

In step 414-B1, the control module compares the seek speed with a first predetermined or minimum seek speed. When the seek speed is less than the minimum seek speed the control module proceeds to step 414-B2, otherwise the control module proceeds to step 414-B3. In step 414-B2, the track counters count the track crossings based on a software algorithm. Such tracking is performed while in zone$_1$ and is associated with the second segment $S_2$. In step 414-B3, the control module compares the seek speed with a second predetermined or maximum seek speed. When the seek speed is less than the maximum seek speed the control module proceeds to step 414-B4, otherwise the control module proceeds to step 414-B5.

In step 414-B4, the track counters count the track crossings based on a software algorithm. Such tracking is associated with zone$_2$ and a first portion of the third segment $S_{3A}$. In steps 414-B2 and B4, when the seek speed is less than the minimum seek speed and/or the maximum seek speed, the track counters count track crossings based on the TE signal and the depth estimation signal $F_{d\_est}$.

In step 414-B5, the control module counts the track crossings based on a hardware based algorithm. When the track crossing speed exceeds the maximum seek speed, a hardware based track counter is enabled that utilizes the FE signal and the TE signal for track counting. Such tracking is associated with zone$_3$ and a second portion of the third segment $S_{3B}$. Fortunately, at higher track crossing speeds, where the frequency of the track crossing signal exceeds the bandwidth of the focus loop, the FE signal has a phase value that approaches the depth estimation signal $F_{d\_est}$ or $-F_{d\_est}$. Thus, the FE signal may be used to directly drive a hardware track counter, thereby replacing the QSUM signal that is traditionally used to assist track counting.

In step 416, the control module reduces the seek speed to a target minimum speed when the beam is within a predetermined distance of a target position. The target minimum speed may be the same as the predetermined minimum speed. Such tracking is associated with zone$_2$, zone$_3$ and the fifth segment $S_5$.

In step 418, when the track crossing frequency is less than the second pre-determined threshold, or within a range where the software is able to take over the track counting, the control module disables the hardware based counter and enables the software based counter for track counting continuance.

In step 420, prior to reaching the final track count value, the sled motor is decelerated. The radial seek operation is terminated using a speed limit prior to a final track-lock. The seek speed is reduced below the speed limit to assure proper beam positioning relative to a target track. This further improves performance robustness.

In step 422, the control module activates a tracking loop to lock onto the target track when the target position of the beam is reached. The tracking loop has enough bandwidth to successfully lock on when the seek speed is between the targeted minimum speed and zero.

In step 424, the control module reads from or writes to the storage medium based on the tracking signal when the tracking loop is locked onto the target track. The control module may use a write strategy module and illumination device driver, such as the write strategy module 168 and the driver 202, when writing to the storage medium.

The above-described steps are meant to be illustrative examples; the steps may be performed sequentially, synchronously, simultaneously, or in a different order depending upon the application.

Figure 12:
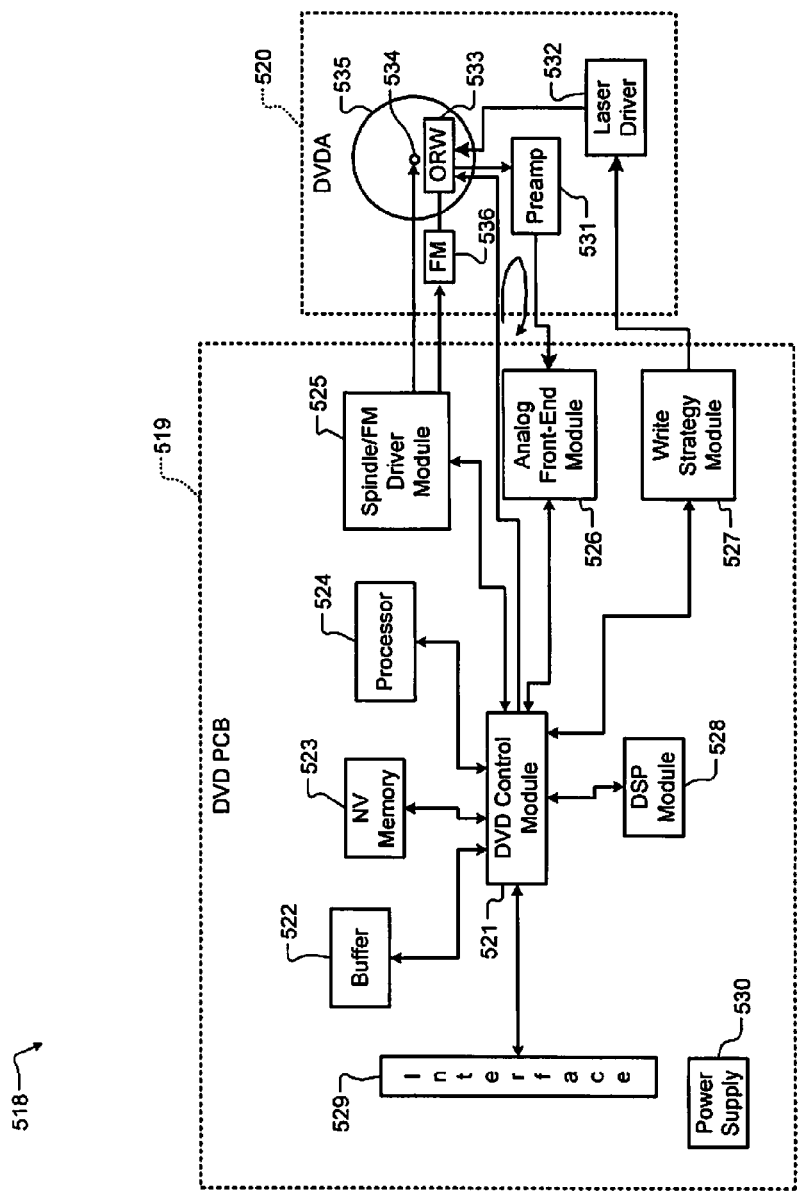
FIG. 12 is a functional block diagram of a DVD drive.
Figure 14:
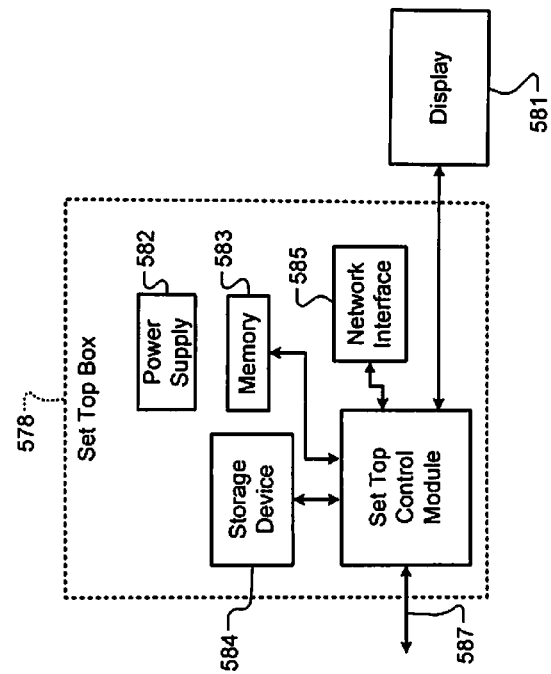
FIG. 14 is a functional block diagram of a set top box.
Figure 13:
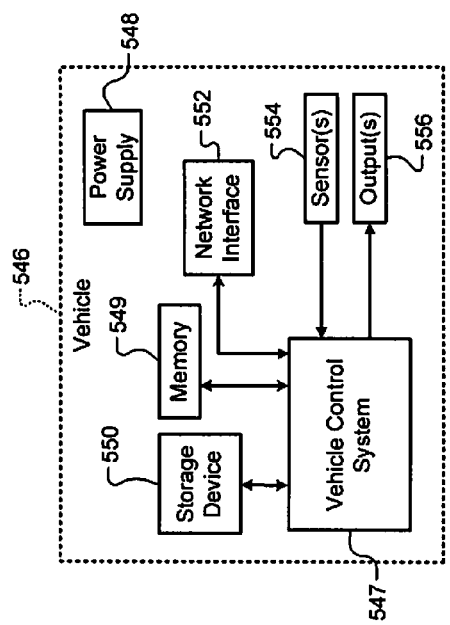
FIG. 13 is a functional block diagram of a vehicle control system.

Referring now to FIGS. 12-14, various exemplary implementations incorporating the teachings of the present disclosure are shown.

Referring now to FIG. 12, the teachings of the disclosure can be implemented in a DVD PCB 519 and a DVD assembly (DVDA) 520 and in association with a DVD control module 521 and an ORW 533 of a DVD drive 518 or of a CD drive (not shown). The tracking system techniques described above may be may be implemented in the DVD drive 518. The DVD drive 518 includes the DVD PCB 519 and the DVDA 520. The DVD PCB 519 includes the DVD control module 521, a buffer 522, nonvolatile memory 523, a processor 524, a spindle/FM (feed motor) driver module 525, an analog front-end module 526, a write strategy module 527, and a DSP module 528.

The DVD control module 521 controls components of the DVDA 520 and communicates with an external device (not shown) via an I/O interface 529. The external device may include a computer, a multimedia device, a mobile computing device, etc. The I/O interface 529 may include wireline and/or wireless communication links.

The DVD control module 521 may receive data from the buffer 522, nonvolatile memory 523, the processor 524, the spindle/FM driver module 525, the analog front-end module 526, the write strategy module 527, the DSP module 528, and/or the I/O interface 529. The processor 524 may process the data, including encoding, decoding, filtering, and/or formatting. The DSP module 528 performs signal processing, such as video and/or audio coding/decoding. The processed data may be output to the buffer 522, nonvolatile memory 523, the processor 524, the spindle/FM driver module 525, the analog front-end module 526, the write strategy module 527, the DSP module 528, and/or the I/O interface 529.

The DVD control module 521 may use the buffer 522 and/or nonvolatile memory 523 to store data related to the control and operation of the DVD drive 518. The buffer 522 may include DRAM, SDRAM, etc. The nonvolatile memory 523 may include flash memory (including NAND and NOR flash memory), phase change memory, magnetic RAM, or multi-state memory, in which each memory cell has more than two states. The DVD PCB 519 includes a power supply 530 that provides power to the components of the DVD drive 518.

The DVDA 520 may include a preamplifier device 531, a laser driver 532, and the optical device 533, which may be an optical read/write (ORW) device or an optical read-only (OR) device. A spindle motor 534 rotates an optical storage medium 535, and a feed motor 536 actuates the optical device 533 relative to the optical storage medium 535.

When reading data from the optical storage medium 535, the laser driver provides a read power to the optical device 533. The optical device 533 detects data from the optical storage medium 535, and transmits the data to the preamplifier device 531. The analog front-end module 526 receives data from the preamplifier device 531 and performs such functions as filtering and A/D conversion. To write to the optical storage medium 535, the write strategy module 527 transmits power level and timing data to the laser driver 532. The laser driver 532 controls the optical device 533 to write data to the optical storage medium 535.

Referring now to FIG. 13, the teachings of the disclosure may be implemented in a drive of a vehicle 546 to track the position of a beam. The drive may include a vehicle control system 547 and a storage device 550. The vehicle 546 may include the vehicle control system 547, a power supply 548, memory 549, the storage device 550, and a network interface 552. If the network interface 552 includes a wireless local area network interface, an antenna (not shown) may be included. The vehicle control system 547 may be a powertrain control system, a body control system, an entertainment control system, an anti-lock braking system (ABS), a navigation system, a telematics system, a lane departure system, an adaptive cruise control system, etc.

The vehicle control system 547 may communicate with one or more sensors 554 and generate one or more output signals 556. The sensors 554 may include temperature sensors, acceleration sensors, pressure sensors, rotational sensors, airflow sensors, etc. The output signals 556 may control engine operating parameters, transmission operating parameters, suspension parameters, etc.

The power supply 548 provides power to the components of the vehicle 546. The vehicle control system 547 may store data in memory 549 and/or the storage device 550. Memory 549 may include random access memory (RAM) and/or nonvolatile memory such as flash memory, phase change memory, or multi-state memory, in which each memory cell has more than two states. The storage device 550 may include an optical storage drive, such as a DVD drive, and/or a hard disk drive (HDD). The vehicle control system 547 may communicate externally using the network interface 552.

Referring now to FIG. 14, the teachings of the disclosure can be implemented in a in a drive of a set top box 578 to track the position of a beam. The drive may include a set top control module 587 and a storage device 584. The set top box 578 includes a set top control module 580, a display 581, a power supply 582, memory 583, a storage device 584, and a network interface 585. If the network interface 585 includes a wireless local area network interface, an antenna (not shown) may be included.

The set top control module 580 may receive input signals from the network interface 585 and an external interface 587, which can send and receive data via cable, broadband Internet, and/or satellite. The set top control module 580 may process signals, including encoding, decoding, filtering, and/or formatting, and generate output signals. The output signals may include audio and/or video signals in standard and/or high definition formats. The output signals may be communicated to the network interface 585 and/or to the display 581. The display 581 may include a television, a projector, and/or a monitor.

The power supply 582 provides power to the components of the set top box 578. Memory 583 may include random access memory (RAM) and/or nonvolatile memory such as flash memory, phase change memory, or multi-state memory, in which each memory cell has more than two states. The storage device 584 may include an optical storage drive, such as a DVD drive, and/or a hard disk drive (HDD).

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A system comprising:
 a control module configured to (i) transition a laser beam from a first position on an storage medium to a second position on the storage medium, (ii) based on a tracking signal, adjust a speed at which the laser beam is transitioned from the first position to the second position, and (ii) while the laser beam is transitioned from the first position to the second position, increase the speed at which the laser beam is transitioned from a first speed to a second speed;

a plurality of error modules configured to (i) determine a track error of a current position of the laser beam, and (ii) estimate a depth of a groove on the storage medium; and a tracking module configured to
while the speed at which the laser beam is transitioned is equal to the first speed, track the current position of the laser beam based on (i) the track error, and (ii) the depth of the groove,
while the speed at which the laser beam is transitioned is equal to the second speed, track the current position of the laser beam based on the track error, and
generate the tracking signal based on the current position.

2. The system of claim 1, further comprising an actuator configured to radially position the laser beam on the storage medium based on a control signal,
wherein the control module is configured to, based on the tracking signal, generate the control signal to transition the laser beam from the first position to the second position.

3. The system of claim 1, wherein:
the plurality of error modules are configured to determine a focus error of the laser beam; and
wherein, while the speed at which the laser beam is transitioned is equal to the second speed, the tracking module is configured to track the current position of the laser beam based on the focus error.

4. The system of claim 3, wherein, while the speed at which the laser beam is transitioned is equal to the first speed, the tracking module does not track the current position of the laser beam based on the focus error.

5. The system of claim 3, further comprising a sensor module configured to (i) detect a portion of the laser beam reflected from the storage medium, and (ii) generate an output signal based on the portion of the laser beam reflected from the storage medium,
wherein the plurality of error modules are configured to generate the focus error based on the output signal of the sensor module.

6. The system of claim 1, wherein, while the speed at which the laser beam is transitioned is equal to the second speed, the tracking module does not track the current position of the laser beam based on the depth of the groove.

7. The system of claim 1, further comprising a track counter configured to:
while the speed at which the laser beam is transitioned is equal to the first speed, count a first number of tracks crossed by the laser beam based on (i) the track error, and (ii) the depth of the groove; and
while the speed at which the laser beam is transitioned is equal to the second speed, count a second number of tracks crossed by the laser beam based on the track error,
wherein the tracking module generates the tracking signal based on (i) the count of the first number of tracks, or (ii) the count of the second number of tracks.

8. The system of claim 1, wherein the control module is configured to:
determine the laser beam to be within a predetermined distance of the second position; and
in response to determining the laser beam to be within the predetermined distance of the second position and prior to the laser beam arriving at the second position, reduce the speed at which the laser beam is transitioned from the second speed to a third speed.

9. The system of claim 8, wherein the control module is configured to:
in response to determining the laser beam to be within the predetermined distance of the second position, activate a tracking loop to lock onto a target track at the second position; and
subsequent to the tracking loop locking onto the target track, read from or write to the storage medium based on the tracking signal.

10. The system of claim 1, wherein the tracking module is configured to:
while the speed at which the laser beam is transitioned is less than the second speed, track the current position of the laser beam according to a first algorithm; and
while the speed at which the laser beam is transitioned is greater than or equal to the second speed, track the current position of the laser beam according to a second algorithm.

11. A method comprising:
transitioning a laser beam from a first position on a storage medium to a second position on the storage medium;
adjusting a speed at which the laser beam is transitioned from the first position to the second position based on a tracking signal;
while the laser beam is transitioned from the first position to the second position, increasing the speed at which the laser beam is transitioned from a first speed to a second speed;
determining a track error of a current position of the laser beam;
estimating a depth of a groove on the storage medium;
while the speed at which the laser beam is transitioned is equal to the first speed, tracking the current position of the laser beam based on (i) the track error, and (ii) the depth of the groove;
while the speed at which the laser beam is transitioned is equal to the second speed, tracking the current position of the laser beam based on the track error; and
generating the tracking signal based on the current position.

12. The method of claim 11, further comprising:
radially positioning the laser beam on the storage medium based on a control signal; and
based on the tracking signal, generating the control signal to transition the laser beam from the first position to the second position.

13. The method of claim 11, further comprising:
determining a focus error of the laser beam; and
while the speed at which the laser beam is transitioned is equal to the second speed, tracking the current position of the laser beam based on the focus error.

14. The method of claim 13, wherein, while the speed at which the laser beam is transitioned is equal to the first speed, the current position of the laser beam is not tracked based on the focus error.

15. The method of claim 13, further comprising:
detecting a portion of the laser beam reflected from the storage medium; and
generating an output signal based on the portion of the laser beam reflected from the storage medium,
wherein the focus error is generated based on the output signal.

16. The method of claim 11, wherein, while the speed at which the laser beam is transitioned is equal to the second speed, the current position of the laser beam is not tracked based on the depth of the groove.

17. The method of claim 11, further comprising:
while the speed at which the laser beam is transitioned is equal to the first speed, counting a first number of tracks crossed by the laser beam based on (i) the track error, and (ii) the depth of the groove; and
while the speed at which the laser beam is transitioned is equal to the second speed, counting a second number of tracks crossed by the laser beam based on the track error,
wherein the tracking signal is generated based on (i) the count of the first number of tracks, or (ii) the count of the second number of tracks.

18. The method of claim 11, further comprising:
determining the laser beam to be within a predetermined distance of the second position; and
in response to determining the laser beam to be within the predetermined distance of the second position and prior to the laser beam arriving at the second position, reducing the speed at which the laser beam is transitioned from the second speed to a third speed.

19. The method of claim 18, further comprising:
in response to determining the laser beam to be within the predetermined distance of the second position, activating a tracking loop to lock onto a target track at the second position; and
subsequent to the tracking loop locking onto the target track, reading from or writing to the storage medium based on the tracking signal.

20. The method of claim 11, wherein:
while the speed at which the laser beam is transitioned is less than the second speed, the current position of the laser beam is tracked according to a first algorithm; and
while the speed at which the laser beam is transitioned is greater than or equal to the second speed, the current position of the laser beam is tracked according to a second algorithm.

* * * * *